US010224799B2

(12) United States Patent
Stautner et al.

(10) Patent No.: US 10,224,799 B2
(45) Date of Patent: Mar. 5, 2019

(54) COOLING ASSEMBLY FOR ELECTRICAL MACHINES AND METHODS OF ASSEMBLING THE SAME

(71) Applicant: General Electric Company, Schenectady, NY (US)

(72) Inventors: Ernst Wolfgang Stautner, Niskayuna, NY (US); Evangelos Trifon Laskaris, Schenectady, NY (US); Kiruba Sivasubramaniam Haran, Clifton Park, NY (US); Ruben Jeevanasan Fair, Niskayuna, NY (US); Randy Scott Longtin, Schenectady, NY (US); Suyu Hou, Niskayuna, NY (US); Fulton Jose Lopez, Clifton Park, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 876 days.

(21) Appl. No.: 13/646,966

(22) Filed: Oct. 8, 2012

(65) Prior Publication Data
US 2014/0100114 A1 Apr. 10, 2014

(51) Int. Cl.
*H02K 55/00* (2006.01)
*F25B 9/00* (2006.01)
(Continued)

(52) U.S. Cl.
CPC ............... *H02K 55/00* (2013.01); *F25B 9/00* (2013.01); *H02K 55/04* (2013.01); *F25B 9/14* (2013.01);
(Continued)

(58) Field of Classification Search
CPC ...... F17C 2270/0527; F17C 2270/0536; F17C 3/085; H01F 6/00; H01F 6/04; H01F 6/06;
(Continued)

(56) References Cited

U.S. PATENT DOCUMENTS 3,769,770 A    11/1973   Deschamps et al.
3,963,950 A *   6/1976   Watanabe et al. ............ 310/54
(Continued)

FOREIGN PATENT DOCUMENTS

CN     101951128 A    1/2011
JP      54158613 A    12/1979
(Continued)

OTHER PUBLICATIONS

Lottin, ALEPH Solenoid Cryogenic System, 1988, ICEC 12.*
(Continued)

*Primary Examiner* — Eric Ruppert
(74) *Attorney, Agent, or Firm* — GE Global Patent Operation; Nittin Joshi

(57) ABSTRACT

A cryocooler assembly for cooling a field winding of an electrical machine having an axis of rotation is provided. The assembly includes a cryocooler and a reservoir coupled in flow communication to the cryocooler and configured to contain a cooling agent. A flow assembly is coupled in flow communication to the reservoir. The flow assembly includes a first flow loop coupled in flow communication to the reservoir; a second flow loop coupled in flow communication to the reservoir; and a plurality of flow members coupled in flow communication to the first flow loop and the second flow loop and coupled to the field winding. Each flow member is configured to thermosiphon the cooling agent in a first state from the reservoir and in a second state to the reservoir.

8 Claims, 11 Drawing Sheets

(51) Int. Cl.
*H02K 55/04* (2006.01)
*H02K 9/20* (2006.01)
*F25B 9/14* (2006.01)

(52) U.S. Cl.
CPC .............. *H02K 9/20* (2013.01); *Y02E 10/725* (2013.01); *Y02E 40/625* (2013.01); *Y10T 29/49014* (2015.01)

(58) Field of Classification Search
CPC .. G01R 33/3815; G01R 33/3804; H02K 5/20; H02K 9/19; H02K 9/193; H02K 9/197; H02K 9/20; H02K 55/04; H02K 3/24
USPC ...... 62/51.1, 6; 335/216, 300; 505/163, 166, 505/875, 878, 888, 890; 310/16, 52
See application file for complete search history.

(56) References Cited

U.S. PATENT DOCUMENTS

| | | | |
|---|---|---|---|
| 4,544,979 A | 10/1985 | Ennis, Jr. et al. | |
| 4,578,962 A * | 4/1986 | Dustmann | 62/505 |
| 4,726,199 A * | 2/1988 | Takano et al. | 62/505 |
| 4,930,318 A | 6/1990 | Brzozowski | |
| 4,986,078 A | 1/1991 | Laskaris | |
| 5,111,665 A | 5/1992 | Ackermann | |
| 5,129,232 A | 7/1992 | Minas et al. | |
| 5,461,873 A * | 10/1995 | Longsworth | 62/51.1 |
| 5,635,888 A | 6/1997 | Good | |
| 5,777,420 A | 7/1998 | Gamble et al. | |
| 5,880,547 A | 3/1999 | Shoykhet | |
| 6,021,643 A * | 2/2000 | Swift | F25B 9/145 62/6 |
| 6,129,477 A | 10/2000 | Shoykhet | |
| 6,590,308 B2 | 7/2003 | Dawson et al. | |
| 6,605,339 B1 | 8/2003 | Marshall et al. | |
| 6,605,885 B2 | 8/2003 | Laskaris et al. | |
| 6,762,517 B2 | 7/2004 | Wang et al. | |
| 6,803,684 B2 | 10/2004 | Wang et al. | |
| 6,995,562 B2 * | 2/2006 | Laskaris et al. | 324/318 |
| 7,548,008 B2 | 6/2009 | Jansen et al. | |
| 7,567,418 B2 | 7/2009 | Halsey | |
| 7,741,738 B2 | 6/2010 | Ries | |
| 7,821,164 B2 | 10/2010 | Laskaris et al. | |
| 8,162,037 B2 * | 4/2012 | Kruip et al. | 165/104.28 |
| 2002/0145355 A1 | 10/2002 | Maguire et al. | |
| 2003/0222533 A1 | 12/2003 | Gamble et al. | |
| 2004/0046474 A1 | 3/2004 | Kalsi | |
| 2004/0075349 A1 * | 4/2004 | Boss et al. | 310/52 |
| 2005/0252219 A1 * | 11/2005 | Van Hasselt | 62/6 |
| 2006/0048522 A1 * | 3/2006 | Yamada | 62/6 |
| 2006/0082249 A1 | 4/2006 | Frank et al. | |
| 2006/0236709 A1 * | 10/2006 | Steinmeyer | 62/259.2 |
| 2007/0120564 A1 * | 5/2007 | Huang et al. | 324/318 |
| 2008/0067881 A1 | 3/2008 | Winn | |
| 2008/0100158 A1 | 5/2008 | Kwon et al. | |
| 2008/0197633 A1 | 8/2008 | Laskaris et al. | |
| 2009/0033450 A1 * | 2/2009 | Huang et al. | 335/300 |
| 2010/0029392 A1 | 2/2010 | Mueller et al. | |
| 2010/0033037 A1 * | 2/2010 | Laskaris | H02K 11/01 310/52 |
| 2010/0089073 A1 * | 4/2010 | Laskaris | H01F 6/04 62/51.1 |
| 2010/0244596 A1 * | 9/2010 | Husband | H02K 55/02 310/64 |
| 2011/0031760 A1 | 2/2011 | Lugg | |
| 2011/0133871 A1 | 6/2011 | Stautner et al. | |
| 2012/0049531 A1 | 3/2012 | Bray | |

FOREIGN PATENT DOCUMENTS

| | | | |
|---|---|---|---|
| JP | 5678351 A | | 6/1981 |
| JP | 02060455 | * | 2/1990 |
| JP | 2011244536 A | | 12/2011 |

OTHER PUBLICATIONS

Green, Helium Cooling Systems for Large Superconducting Physics Detector Magnets, 1992, ICEC 14.*
Yamamoto, JP02060455TRANS (English Translation), Feb. 1990.*
Bischof, Practical Experience on the Operation of a 320 kVA Synchronous Generator With a Superconducting Field Winding, Mar. 1989, IEEE Transactions on Magnetics.*
Bratoljic, Tests on a 320 KVA Superconducting Generator, Mar. 1984, IEEE Transactions on Power Apparatus and Systems.*
Yamamoto, JP02060455HT (English Translation), Feb. 1990.*
Hahn et al., "Transient Shielding Effect of Slitted Electrothermal Shield of Superconducting Generator", IEEE Transactions on Magnetics, vol. 28, Issue 1, pp. 295-298, Jan. 1992.
Saho et al., "A New Technique for the Analysis of Torque Tube Heat Exchangers of Superconducting Generators", Cryogenics, vol. 36, Issue 5, pp. 343-349, 1996.
Murphy et al., "A Generalized Approach to the Design of Superconducting Field Windings", Westinghouse Research and Development Center, pp. 785-794, 1978.
Sullivan, "Optimal Choice for Number of Strands in a Litz-Wire Transformer Winding", IEEE Transactions on Power Electronics, vol. No. 14, Issue No. 02, pp. 283-291, Mar. 1999.

* cited by examiner

COOLING ASSEMBLY FOR ELECTRICAL MACHINES AND METHODS OF ASSEMBLING THE SAME

STATEMENT REGARDING FEDERALLY SPONSORED RESEARCH & DEVELOPMENT

This disclosure was made with Government support under contract number DE-EE0005143 awarded by the Department of Energy (DOE). The Government has certain rights in the disclosure.

BACKGROUND OF THE DISCLOSURE

The embodiments described herein relate generally to electrical machines, and more particularly, to methods and systems for cryocooling of electrical machines.

Some electrical machines, such as generators or motors, can have a rotating rotor and a stationary stator. The use of superconducting windings in some electrical machines can result in an increase in electromagnetic forces generated by the windings and an increase in flux densities within the machines. The current density and thus the specific power of these machines can be increased, and the efficiency of the machine can also be increased by the use of cryocoolers. Cryogenically cooled windings of electrical machines, however, typically have to be thermally isolated from the environment and have to be kept at a required low temperature by a coolant. Effective thermal isolation can be achieved for the cryogenically cooled parts by separating the cooled parts from warmer components of the electrical machine.

Conventional superconducting generators may include high power, forced-flow cooling systems. Forced-flow cooling systems, however, may include bulky, large and costly equipment such as, for example, helium pumps, blowers and/or helium refrigeration systems. Besides sometimes being unwieldy and fault-prone, these components may not fit within operational housings such as, for example, nacelles of wind turbines.

Moreover, some conventional superconducting generators may include torque transfer assemblies that can absorb and/or transfer torque generated by electromagnetic loads of components such as stators and/or rotors. Conventional torque transfer assemblies, however, may include large torque tubes which can increase the required space footprint within operational housings. Moreover, some conventional torque tubes are inefficiently coupled to heat loads which may lead to inadvertent heat transfer losses.

Furthermore, some conventional superconducting generators may include a coil former that includes coil windings positioned on an outer surface of the coil former. A lid may be needed to couple the coil winding to the coil former to resist electromagnetic radial forces applied to the coil windings. Lids, however, may necessitate increasing the required air gap between rotating and stationary components which could add to increased space requirements and cost to the superconducting generator. Moreover, conventional lids may decrease the heat transfer from the coil windings.

BRIEF DESCRIPTION OF THE DISCLOSURE

In one aspect, a cryocooler assembly for cooling a field winding assembly of an electrical machine having an axis of rotation is provided. The assembly includes a cryocooler and a reservoir coupled in flow communication to the cryocooler and configured to contain a cooling agent. A flow assembly is coupled in flow communication to the reservoir. The flow assembly includes a first flow loop coupled in flow communication to the reservoir; a second flow loop coupled in flow communication to the reservoir; and a plurality of flow members coupled in flow communication to the first flow loop and the second flow loop and coupled to the field winding assembly. Each flow member is configured to thermosiphon the cooling agent in a first state from the reservoir and in a second state to the reservoir. A torque assembly is coupled to the field winding assembly and configured to receive torque experienced by the field winding assembly as the cooling agent thermosiphons through the plurality of flow members.

In another aspect, a cryocooler assembly for cooling a stationary assembly of an electrical machine is provided. The assembly includes a cooling assembly coupled to the stationary assembly and includes a thermal shield that is configured to enclose the stationary assembly. A torque assembly is coupled to the stationary assembly, wherein the torque assembly includes a first torque tube positioned within the thermal shield and having a first pattern of a plurality of first stiffening members. A second torque tube is coupled to the first torque tube and positioned outside of the thermal shield. The second torque tube includes a second pattern of a plurality of second stiffening members, the first and second torque tubes are configured to thermally isolate the stationary assembly and to receive torque experienced by the stationary assembly.

In another aspect, a superconducting generator having an axis of rotation is provided. The generator includes a housing; a rotating stator; and a rotor coupled to the housing coaxial to the rotating stator and separated from the rotating stator by a gap. The rotor includes a coil former having a first side and a second side, the first side is orientated toward the rotating stator and the second side orientated toward the axis of rotation and includes a recess. The stator also includes a coil positioned within the recess and coupled to the second side. A cryocooler assembly is coupled to the coil former and configured to cool the rotor.

In yet another aspect, a method of assembling a superconducting generator having a rotor and a stator is provided. The method includes coupling a reservoir to the rotor, the reservoir configured to contain a cooling agent and coupling a cryocooler in flow communication to the reservoir. The method further includes coupling a plurality of flow members to the rotor and in flow communication to the reservoir, each flow member is configured to thermosiphon the cooling agent in a first state from the reservoir and in a second state to the reservoir. A torque assembly is coupled to the rotor, wherein the torque assembly is configured to receive torque experienced by the rotor as the cooling agent thermosiphons through the plurality of flow members.

In another aspect, a cryocooler assembly for cooling a rotor of an electrical machine having an axis of rotation is provided. The assembly includes a cryocooler and a reservoir coupled in flow communication to the cryocooler and configured to contain a cooling agent. A flow assembly is coupled in flow communication to the reservoir. The flow assembly includes a first flow loop coupled in flow communication to the reservoir; a second flow loop coupled in flow communication to the reservoir; and a plurality of flow members coupled in flow communication to the first flow loop and the second flow loop and coupled to the rotor, wherein each flow member is configured to thermosiphon the cooling agent in a first state from the reservoir and in a second state to the reservoir.

In yet another aspect, a cryocooler assembly for cooling a rotor of an electrical machine is provided. The assembly includes a thermal shield configured to enclose the rotor and a torque assembly coupled to the rotor. The torque assembly includes a first torque tube positioned within the thermal shield and coupled to the rotor, the first torque tube has a first repeating pattern of a plurality of first stiffening members. The torque assembly further includes a second torque tube coupled to the first torque tube and positioned outside of the thermal shield, the second torque tube has a second repeating pattern of a plurality of second stiffening members. The first and second torque tubes are configured to thermally isolate the rotor and to receive torque experienced by the rotor. A thermal barrier is coupled to the first torque tube and the second torque tube.

DETAILED DESCRIPTION OF THE DISCLOSURE

The embodiments described herein relate to electrical machines and methods of cooling the electrical machines. More particularly, the embodiments relate to a flow assembly and a torque assembly that are configured to facilitate cooling the electrical machine and thermally isolating the electrical machine. It should be understood that the embodiments described herein for electrical machines are not limited to generators, and should be further understood that the descriptions and figures that utilize a generator and a wind turbine are exemplary only.

Figure 1:
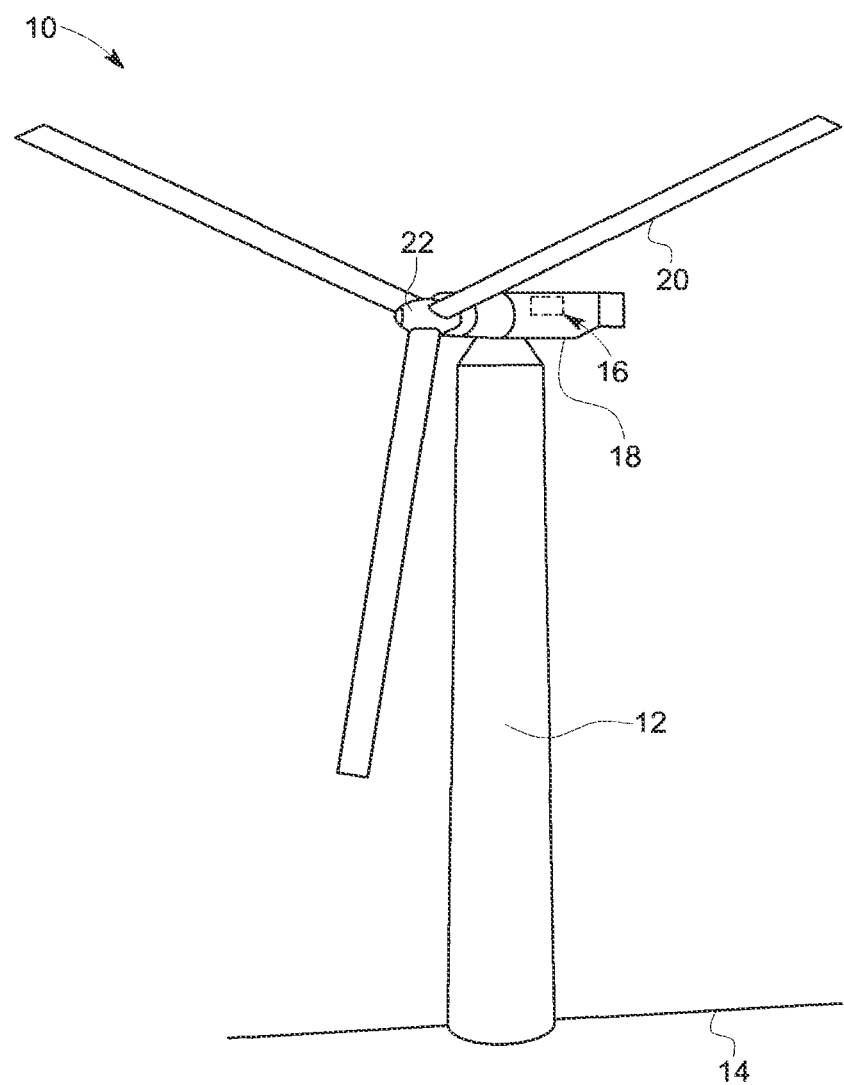
FIG. 1 is perspective view of a wind turbine that includes an exemplary superconducting generator.

FIG. 1 is a perspective view of a wind turbine 10 that includes a tower 12 anchored to surface 14 such as, for example, a ground, a floating platform or a sea-bed floor. A superconducting generator 16 is housed within a nacelle 18 mounted on top of tower 12. Nacelle 18 is coupled to tower 12 to turn turbine blades 20 with respect to the direction of the wind. Blades 20 extend radially outward from a hub 22, typically face into the wind and are turned by the energy of the wind. The superconducting generator 16 is driven directly by blades 20 and hub 22.

In the exemplary embodiment, tower 12 is between about 20 meters and about 100 meters in height, about one meter to about two meters in diameter at the top and about four meters in diameter at the base. In the exemplary embodiment, blades 20 are between about 10 meters and about 45 meters in length and are equally spaced about hub 22. Blades 20 may have a fixed pitch or a variable pitch, depending on whether a variable pitch gearbox (not shown) is included in hub 20.

Figure 2:
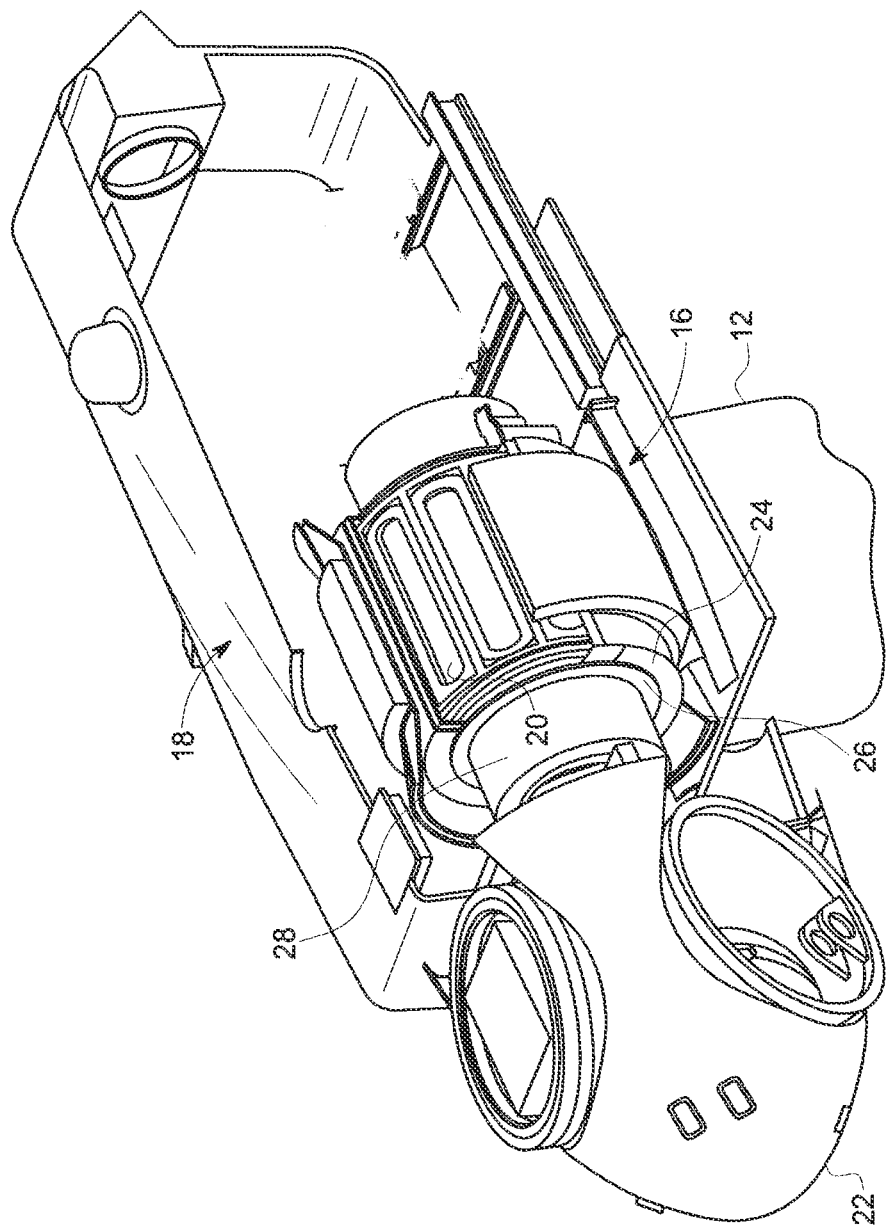
FIG. 2 is a cut-away view of the superconducting generator housed in a nacelle and coupled to a hub of the wind turbine shown in FIG. 1.

FIG. 2 is a cut-away view of superconducting generator 16 housed in nacelle 18 and coupled to hub 22. Superconducting generator 16 includes an annular rotating armature assembly 24 (stator), and a stationary field winding assembly 26 (rotor), which is surrounded by stator 24. A support tube 28 is coupled to hub 22 and to rotor 26, wherein rotor 26 is coaxial with stator 24. Rotor 26 is configured to receive a cooling agent (not shown).

Figure 3:
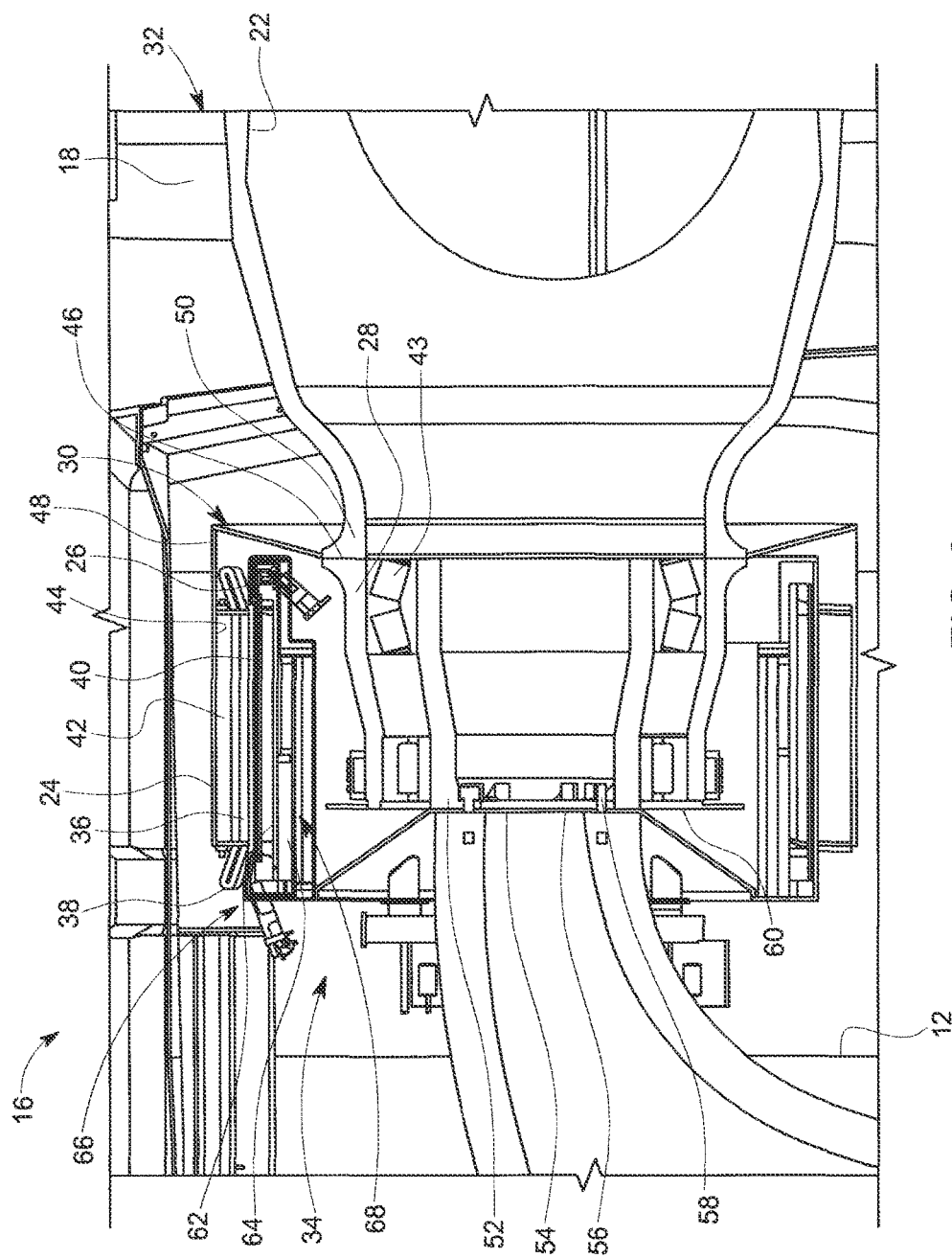
FIG. 3 is a cross sectional view of the exemplary superconducting generator shown in FIG. 2.

FIG. 3 is a cross sectional view of superconducting generator 16 which includes a support assembly 30 which is configured to couple rotor 26 and stator 24 to nacelle 18. Nacelle 18 includes a hub end 32 coupled to hub 22 and a non-hub end 34 coupled to tower 12. Stator 24 includes conductive windings 36 (e.g., coils or bars) arranged longitudinally along the length of stator 24 and on an inside cylindrical surface of stator 24. In the exemplary embodiment, conductive windings 36 are coupled at their opposite ends to one another by conductive end turns 38. Windings 36 are separated from rotating stator 24 by an air gap 40.

In the exemplary embodiment, stator 24 includes a cylindrical yoke 42 that supports windings 36. An outer surface 44 of yoke 42 is coupled to a cylindrical housing 48 of support assembly 30 that is configured to rotate with stator 24. Cylindrical housing 48 is coupled to a circular disc 46 that supports housing 48 and rotor 26. Disc 46 includes a circular aperture (not shown) that is mounted to an annular base 50 of hub 22. Disc 46 is coupled to rotating cylindrical support tube 28 that is radially inward of windings 36. A pair of annular bearings 43 rotatably support tube 28 on a stationary base tube 52 attached to a mount 54 of support assembly 30 that is supported by nacelle 18. A ring bracket 56 attaches mount 54 to a bracket 58 for base tube 52.

In the exemplary embodiment, base tube 52 supports a field winding support disc 60 upon which is mounted to rotor 26. Rotor 26 includes a coil former 62 and coil windings 64. Superconducting generator 16 includes a cooling assembly 66 coupled to rotor 26 and a torque assembly 68 coupled to rotor 26, which is configured to retain and insulate coil windings 64 so that coil windings 64 are cooled to near absolute zero (e.g., 4 K).

Figure 4:
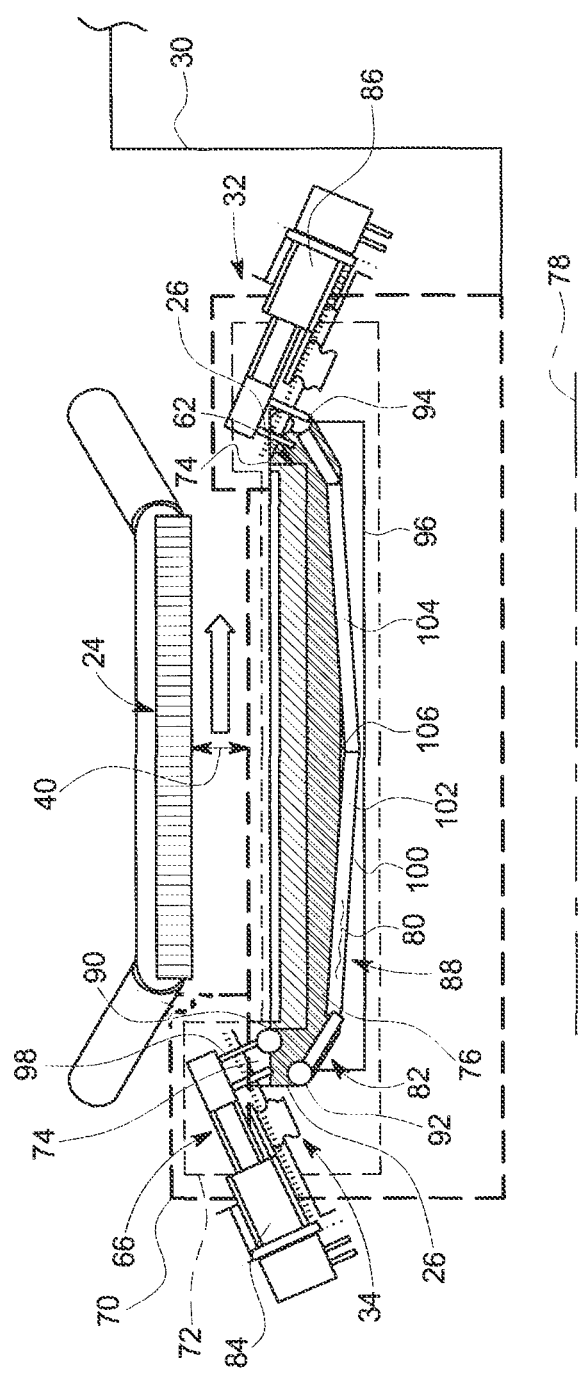
FIG. 4 is a cross sectional view of an exemplary cooling assembly of the superconducting generator shown in FIG. 2.

FIG. 4 is a cross sectional view of cooling assembly 66 coupled to rotor 26. Cooling assembly 66 is positioned within a vacuum chamber 70 and a thermal shield 72 which are configured to isolate cooling assembly 66 from warmer or ambient temperatures that are present within generator 16. Moreover, vacuum chamber 70 is configured to improve the efficiency of coil former 62. More particularly, vacuum chamber 70 is coupled to support assembly 30 to enclose rotor 26 to facilitate forming an air tight environment within cooling assembly 66. Vacuum chamber 70 is evacuated to form a vacuum which facilitates insulating rotor 26 from warmer temperatures. Moreover, thermal shield 72 includes a thermal insulation material such as, but not limited to, G-10 phenolic materials and glass epoxy materials to minimize heat transfer from warmer temperatures to rotor 26.

Cooling assembly 66 is coupled to coil former 62 which includes a first side 74 that is orientated toward rotor 26 and a second side 76 that is orientated toward axis of rotation 78 of generator 16. Cooling assembly 66 is configured to maintain a cooling agent 80 at cryogenic temperatures and move cooling agent 80 through a cryogenic cooling loop 82 that is coupled in thermal communication to coil former 62. Cooling agent 80 includes fluids such as, but not limited to, helium, hydrogen, neon, nitrogen and combinations thereof. Alternatively, cooling agent 80 can include any material that enables cryogenic cooling of coil former 62. Cooling assembly 66 includes a closed system, however, additional cooling agent 80 can be added to maintain required pressure and/or volume of fill level in cooling loop 82.

In the exemplary embodiment, cooling assembly 66 includes a first cryocooler 84, a second cryocooler 86, a flow assembly 88 and a reservoir 90 which is coupled in flow communication to first and second cryocoolers 84 and 86 and flow assembly 88. First and second cryocoolers 84 and 86 are configured to condense cooling agent 80 to achieve a superconducting condition for the field coil assembly. In the exemplary embodiment, first and second cryocoolers 84 and 86 may be a pulse tube cryocooler, a GM cryocooler or a Stirling cryocooler or other cooler. Cryocoolers 84 and 86 may include any configuration that enables cooling assembly 66 to function as described herein. First and second cryocoolers 84 and 86 are coupled to coil former 62 at positions to minimize and/or reduce interference and/or contact with rotor 26 as stator 24 rotates around rotor 26 during operations. Moreover, first and second cryocoolers 84 and 86 are positioned within cooling assembly 66 to facilitate convenient access for maintenance and/or replacement purposes.

Reservoir 90 is configured to contain an amount of cooling agent 80, wherein reservoir 90 has a volume from about 5 liters to about 30 liters. More particularly, reservoir 90 has a volume of about 11 liters. Alternatively, reservoir 90 can have a volume less than about 5 liters and more than about 30 liters. In the exemplary embodiment, reservoir 90 is coupled to first side 74 of coil former 62 and positioned within gap 40. Reservoir 90 is sized and shaped to position within gap 40 to reduce a space footprint to house reservoir 90 within cooling assembly 66 which facilitates increasing space efficiency of cooling assembly 66. Moreover, reservoir 90 is sized, shaped and positioned within gap 40 to reduce and/or eliminate interference and/or contact with rotor 26 as stator 24 rotates around rotor 26 during operation. Alternatively, reservoir 90 can be positioned in any location within cooling assembly 66 to enable cooling assembly 66 to function as described herein. Reservoir 90 can include more than one reservoir 90 such as, for example, one reservoir (not shown) coupled to coil former 62 at hub end 32 and another reservoir 90 coupled at non-hub end 34. A thermal insulation (not shown) can couple to reservoir 90 and first side 74 to minimize and/or reduce reservoir 90 acting as a heat sink to facilitate uniform cooling of coil former 62 between hub end 32 and non-hub end 34.

Flow assembly 88 includes a first loop 92, a second loop 94 and supply loop 96, wherein first and second loops 92 and 94 are coupled in flow communication to reservoir 90 by conduits 98. First and second loops 92 and 94 are configured to receive cooling agent 80 from reservoir 90 and configured to return cooling agent 80 to reservoir 90 under thermosiphon force as described herein. More particularly, first and second flow loops 92 and 94 are sized and shaped to facilitate flow of cooling agent 80 through cooling loop 82. First and second loops 92 and 94 are sized and shaped to reduce a space footprint within cooling assembly 66. In the exemplary embodiment, first and second loops 92 and 94 have a volume from about 0.5 to about 5 liters. More particularly, first and second loops 92 and 94 have a volume of about 1.9 liters. Alternatively, first and second loops 92 and 94 can have any volume that enables cooling agent 80 to flow out of and into reservoir 90 and through cooling loop 82.

Flow assembly 88 further includes a plurality of flow members 100 coupled in flow communication to first loop 92 and second loop 94. Moreover, flow members 100 are coupled to coil former 62 to facilitate heat transfer from coil former 62 as described herein. Flow members 100 are sized and shaped to channel cooling agent 80 from first loop 92 to second loop 94 and to reduce a space footprint within cooling assembly 66. Flow members 100 include a heat conductive material such as, for example, stainless steel, copper and aluminum or other metallic material. Flow member 100 can include any type of material to enable cooling assembly 66 to function as described herein. In the exemplary embodiment, flow members 100 are coupled to second side 76 of coil former 62. Alternatively, flow members 100 can be coupled to coil former first side 74. Moreover, flow members 100 can be embedded within channels (not shown) of coil former 62. Flow members 100 can couple to any portion of coil former 62 to enable heat transfer from coil former 62 to function as described herein. Flow members 100 can couple to coil former 62 by fasteners (not shown) such as, but not limited to, low temperature and/or high temperature bolts, rivets, welds and adhesives. In the exemplary embodiment, flow members 100 are tubular shaped having a diameter from about 5 mm to about 10 mm. More particularly, flow members 92 and 94 include a diameter of about 20 mm. Alternatively, flow members 100 and 92 and 94 can include any size, shape and orientation to enable cooling assembly 66 to function as described herein.

Each flow member 100 includes a first portion 102 and a second portion 104 which are coupled in flow communication to each other at an angle 106. Moreover, first portion 102 and second portion 104 are angled at least about 5° (minimum) as measured from axis of rotation 78. In the exemplary embodiment, first and second portions 102 and 104 are angled from about 5° to about 45° as measured from axis of rotation 78. First and second portions 102 and 104 are angled between reservoir 90 and axis of rotation 78 to facilitate flow of cooling agent 80 within flow assembly 88 by reducing and/or eliminating vapor lock within cooling agent 80 flowing through at least first loop 92, second loop 94 and flow members 100.

Supply member 96 is coupled in flow communication to first loop 92 and second loop 94. Supply member 96 is configured to receive cooling agent 80 from first loop 92 and to channel cooling agent 80 to second loop 94. Supply member 96 is positioned substantially horizontal between first loop 92 and second loop 94 to facilitate uniform flow such as, for example flow exchange/supply, of cooling agent 80 to achieve and maintain a predetermined pressure and/or volume of cooling agent 80 within first loop 92 and second loop 94.

Figure 5:
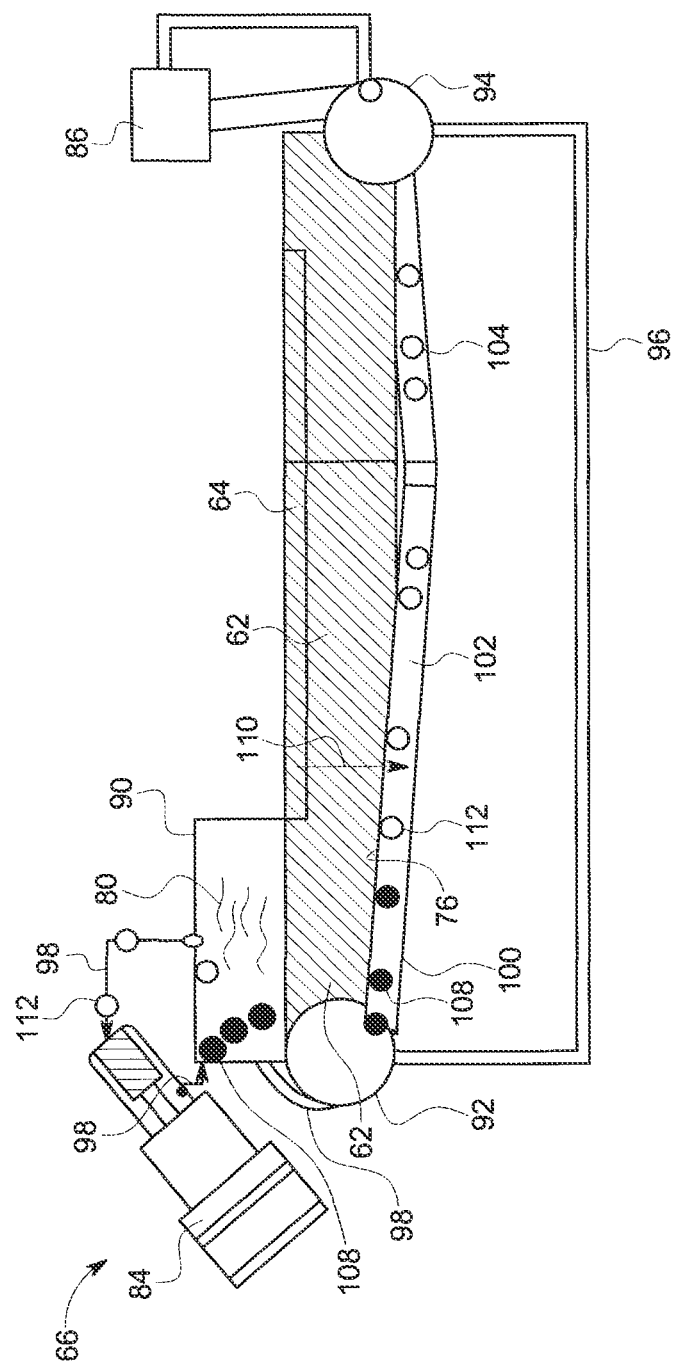
FIG. 5 is another cross sectional view of the cooling assembly shown in FIG. 4.

FIG. 5 is another cross sectional view of cooling assembly 66. Reservoir 90 is configured to contain cooling agent 80 in a first state 108 such as a liquid state. Moreover, reservoir 90 is configured to discharge cooling agent 80 in first state 108 into first loop 92 via conduits 98. More particularly, cooling agent 80 discharges from reservoir 90 and into first loop 92 under force of gravity, which facilitates reducing and/or eliminating forced flow components (not shown). Alternatively, a forced flow device may be used to discharge cooling agent 80 from reservoir 90 and into first loop 92. First loop 92 is configured to discharge cooling agent 80 in first state 108 into flow members 100 to facilitate transferring heat 110 generated by coil windings 64 and vacuum chamber 70 (shown in FIG. 4) to cooling agent 80. Flow members 100 are configured to channel cooling agent 80 from first loop 92, within first portion 100 and second portion 104 and into second loop 94.

In the exemplary embodiment, coil windings 64 generate and receive heat 110 which conducts across coil former 62 and contacts flow members 100 which are coupled to second side 76 of coil former 62. Heat 110 at least partially changes cooling agent 80 from first state 108 such as a liquid to a second state 112 such as a vapor. Coil windings 64 are cooled as first state cooling agent 80 at least partially vaporizes. Flow members 100 are configured to thermosiphon cooling agent 80 in first state 108 and second state 112 from first and second loops 92 and 94 and into reservoir 90. More particularly, heat 110 causes cooling agent 80, in first state 108, to expand and become less dense and to at least partially change phase to second state 112. Cooling agent 80 in second state 112 is more buoyant than cooling agent 80 in first state 108 which facilitates convective movement of cooling agent 80 within flow members 100 and within first and second loops 92 and 94. More particularly, convection moves cooling agent 80 through first loop 92, second loop 94 and flow members 100. Convection continues to move cooling agent 80 from first and second loops 92 and 94 into reservoir 90 via conduits 98.

Cooling agent 80, in second state 112, is configured to continue to flow from reservoir 90 and into first cryocooler 84 and second cryocooler 86. More particularly, cooling agent vapor flows through conduits 98 to cryocoolers 84 and 86, where cooling agent 80 is cooled, liquefied to first state 108 and returned via conduit 98 to reservoir 90. Reservoir 90 is configured to discharge cooling agent 80 in first state 108 back into first loop 92 to continue thermosiphoning cooling agent 80 through first loop 92, second loop 94, and flow members 100. Cryocoolers 84 and 86 condense cooling agent vapor, which flows in thermal contact with coil windings 64 and cools coil windings 64 to achieve a superconducting condition of the field winding. Supply member 96 is configured to maintain a balance of pressure and/or volume of cooling agent 80 between first and second loops 92 and 94. Moreover, cooling thermal shield 72 (shown in FIG. 4) assists in cooling coil windings 64 and reducing warmer temperatures that are present in cooling assembly 66 being absorbed by cooling agent 80.

Figure 6:
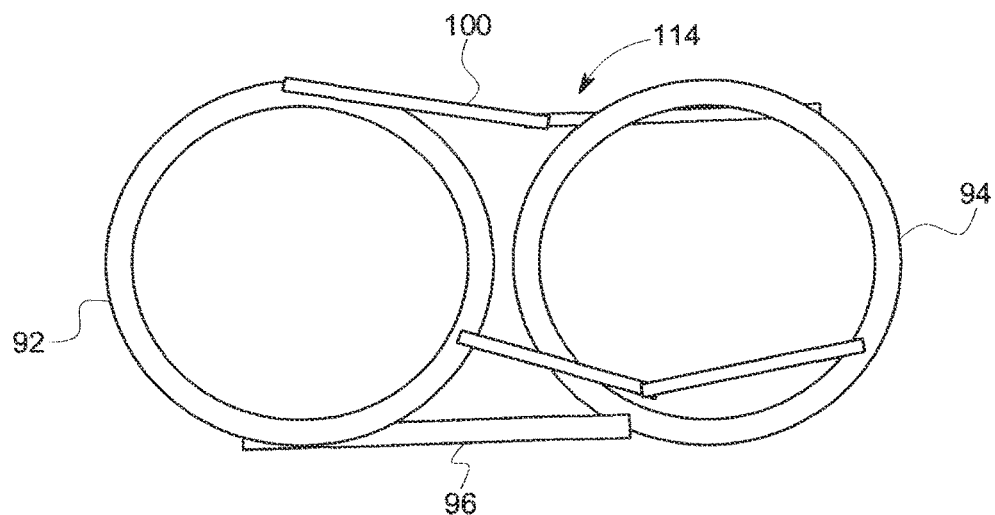
FIG. 6 is a perspective view of an exemplary arrangement of the cooling assembly shown in FIG. 4.

FIGS. 6-9 illustrate exemplary embodiments of arrangements of flow assembly 88. FIG. 6 illustrates flow members 100 configured in a squirrel cage (or herringbone) arrangement 114 between first and second loops 92 and 94. More particularly, a plurality of flow members 100 is coupled in flow communication to first loop 92 and second loop 94. Moreover, supply member 96 is coupled in flow communication to first and second loops 92 and 94. In the exemplary embodiment, squirrel cage arrangement 114 includes up to and including eighteen flow members 100 arranged between and coupled in flow communication to first and second loops 92 and 94. Alternatively, squirrel cage arrangement 114 can include more than eighteen flow members 100. Squirrel cage arrangement 114 can include any number of flow members 100 to enable thermosiphon flow of cooling agent 80 within flow assembly 88. In the exemplary embodiment, squirrel cage arrangement 114 of flow members 100 is coupled to coil former second side 76 (shown in FIG. 4). Alternatively, squirrel cage arrangement 114 can be coupled to coil former first side 74 (shown in FIG. 4).

Figure 7:
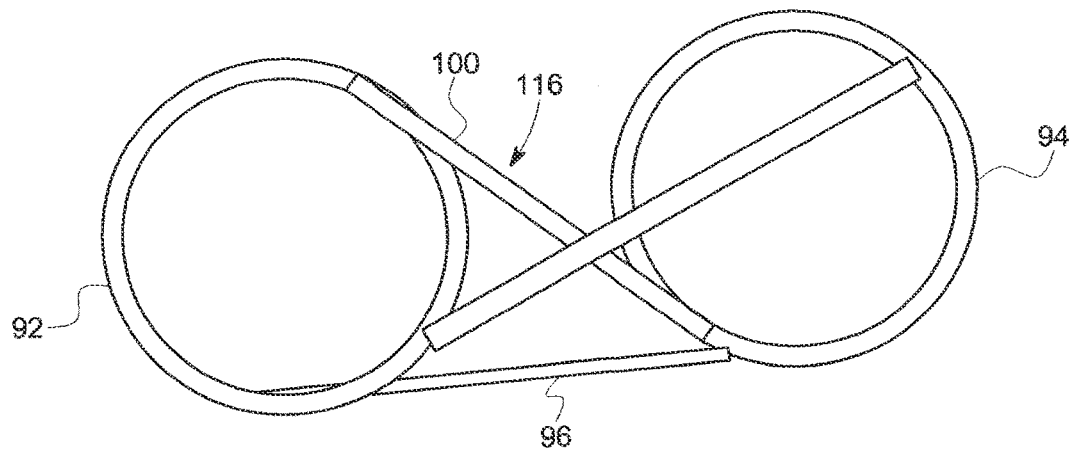
FIG. 7 is a perspective view of another exemplary arrangement of the cooling assembly shown in FIG. 4.

FIG. 7 illustrates flow members 100 configured in a helix arrangement 116 between first loop 92 and second loop 94. More particularly, a plurality of flow members 100 is coupled in flow communication to first loop 92 and second loop 94. Moreover, supply member 96 is coupled in flow communication to first and second loops 92 and 94. In the exemplary embodiment, helix arrangement 116 includes up to and including eighteen flow members 100 arranged between and coupled in flow communication to first and second loops 92 and 94. Alternatively, helix arrangement 116 can include more than eighteen flow members 100. Helix arrangement 116 can include any number of flow members 100 to enable thermosiphon flow of cooling agent 80 within flow assembly 88. In the exemplary embodiment, helix arrangement 116 of flow members 100 is coupled to coil former second side 76 (shown in FIG. 4). Alternatively, helix arrangement 116 can be coupled to coil former first side 74 (shown in FIG. 4).

Figure 8:
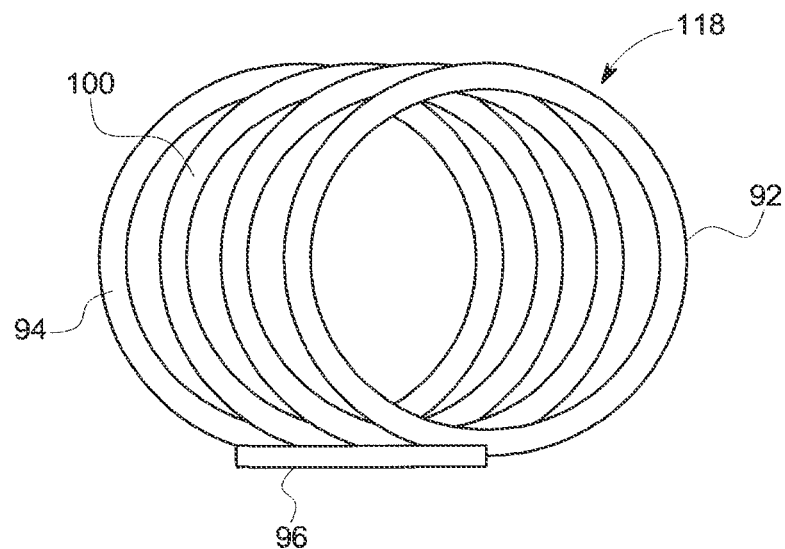
FIG. 8 is a perspective view of another exemplary arrangement of the cooling assembly shown in FIG. 4.

FIG. 8 illustrates flow members 100 configured in a coil arrangement 118 between first and second loops 92 and 94. More particularly, a plurality of flow members 100 is coupled in flow communication to first loop 92 and second loop 94. Moreover, supply member 96 is coupled in flow communication to first and second loops 92 and 94 and flow members 100. More particularly, supply member 96 is configured to supply cooling agent 80 to first loop 92, second loop 94 and flow members 100 to facilitate maintaining fluid flow and fluid pressure within first loop 92, second loop 94 and flow members 100. In the exemplary embodiment, coil arrangement 118 of flow members 100 is coupled to coil former second side 76 (shown in FIG. 4). Alternatively, coil arrangement 118 can be coupled to coil former first side 74 (shown in FIG. 4).

Figure 9:
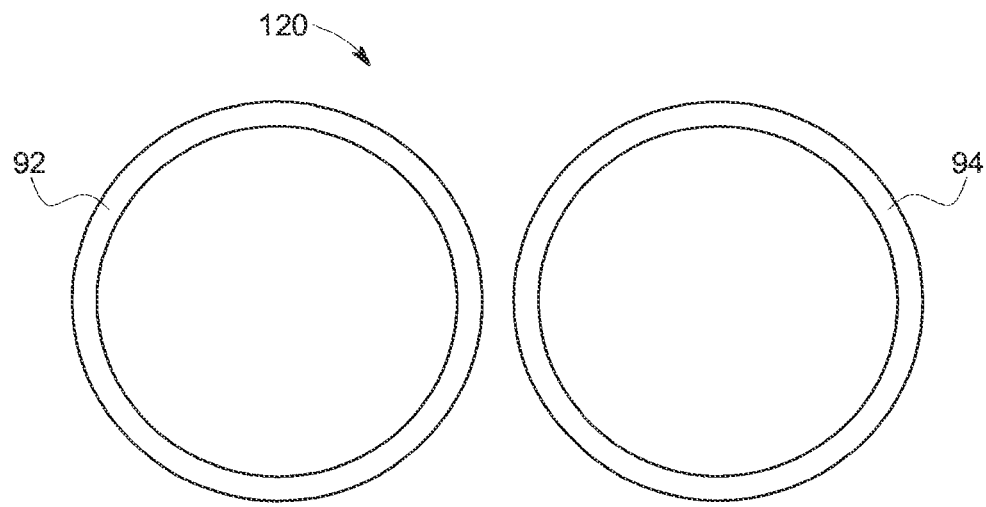
FIG. 9 is a perspective view of another exemplary arrangement of the cooling assembly shown in FIG. 4.

FIG. 9 illustrates first loop 92 and second loop 94 in a circular arrangement 120. More particularly, first loop 92 is coupled in flow communication to first cryocooler 84 (shown in FIG. 4) and second loop 94 is coupled in flow communication to second cryocooler 86 (shown in FIG. 4). In the exemplary embodiment, circular arrangement 120 of flow members 100 is coupled to coil former second side 76 (shown in FIG. 4). Alternatively, circular arrangement 120 can be coupled to coil former first side 74 (shown in FIG. 4).

Arrangements 114, 116, 118, and 120 shown in FIGS. 6-9 are configured to couple in flow communication to first cryocooler 84 (shown in FIG. 4) which is coupled at non-hub end 34 and/or couple to second cryocooler 86 (shown in FIG. 4) coupled to hub end 32. Alternatively, arrangements 114, 116, 118, and 120 can couple in flow communication to any cryocooler of cooling assembly 66. Moreover, in an alternative embodiment, arrangements 114, 116, 118, and 120 can terminate flow route at second loop 94 wherein an insulated return member (not shown) can couple second loop 94 to reservoir 90.

Figure 10:
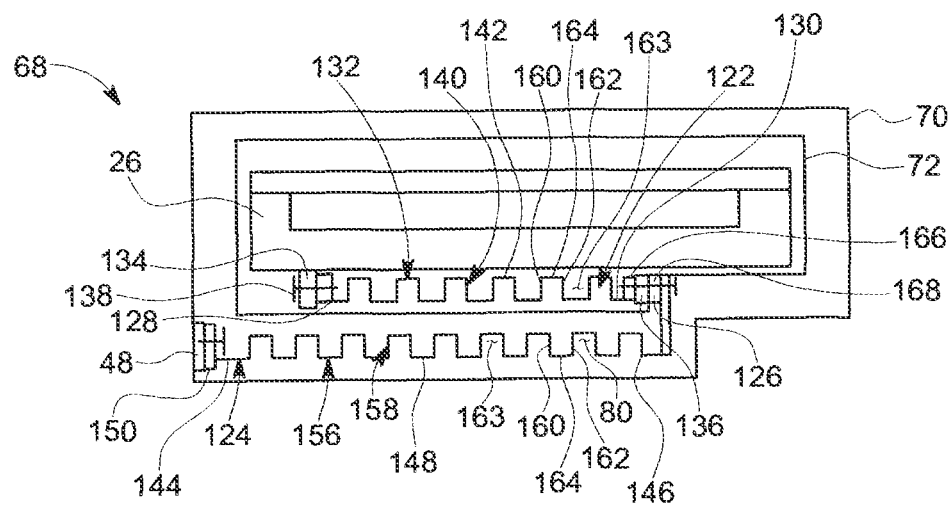
FIG. 10 is a cross sectional view of an exemplary torque assembly of the cooling assembly shown in FIG. 2.

FIG. 10 is a cross sectional view of torque assembly 68. Torque assembly 68 is coupled to rotor 26 and is configured to support rotor 26 and to receive torque generated by stator 24 and experienced by rotor 26 as cooling agent 80 (shown in FIG. 5) thermosiphons through flow members 100 (shown in FIG. 4). More particularly, torque assembly 68 is configured to transfer torque generated by stator 24 to rotor 26.

Moreover, torque assembly 68 is configured to thermally isolate rotor 26 from warmer temperatures that are present in cooling assembly 66.

In the exemplary embodiment, torque assembly 68 includes a first torque tube 122, a second torque tube 124 and a thermal barrier 126 which are positioned within vacuum chamber 70. Moreover, first torque tube 122 is positioned within thermal shield 72 and second torque tube 124 is positioned outside of thermal shield 72. To provide mechanical support and thermal isolation for rotor 26, first and second torque tubes 122 and 124 include a high strength and low thermal conductive material such as, but not limited to, Inconel and titanium alloy. Alternatively, first and second torque tubes 122 and 124 can include composite materials and/or a combination of metallic and composite materials. First and second torque tubes 122 and 124 can include any type of material to enable torque assembly 68 to function as described herein. Moreover, first and second torque tubes 122 and 124 have a length from about 50 cm to about 250 cm and have a wall thickness from about 0.5 cm to about 5 cm. First and second torque tubes 122 and 124 can have any length and/or wall thickness to enable torque assembly 68 to function as described herein.

First torque tube 122 includes a first end 128, a second end 130, and body 132 located between first and second ends 128 and 130. First end 128 is coupled to a support 134 which is coupled to rotor 26 and second end 130 is coupled to a support 136 which is coupled to second torque tube 124. In the exemplary embodiment, fasteners 138 such as, but not limited to, flanges, screws, rivets or welds couple first and second ends 128 and 130 to respective supports 134 and 136. Body 132 includes a first pattern 140 of a plurality of first stiffening members 142. First pattern 140 of first stiffening members 142 is configured to thermally isolate rotor 26 within thermal shield 72. Moreover, first pattern 140 of first stiffening members 142 is configured to receive torque generated by stator 24, experienced by rotor 26 and transfer torque to at least one of support 134, support 136 and second torque tube 124.

Second torque tube 124 includes a first end 144, a second end 146, and body 148 located between first and second ends 144 and 146. First end 144 is coupled to a support 150 which is coupled to housing 48 and second end 146 is coupled to support 136 which is coupled to first torque tube 122. In the exemplary embodiment, fasteners 138 such as, but not limited to, flanges, screws or welds couple first and second ends 144 and 146 to respective supports 150 and 136. Body 148 includes a second pattern 156 of a plurality of second stiffening members 158. Second pattern 156 of second stiffening members 158 is configured to thermally isolate stator 26 within vacuum chamber 70. Moreover, second pattern 156 of second stiffening members 158 is configured to receive torque generated by stator 24, experienced by rotor 26 and transfer torque to housing 48.

First and second patterns 140 and 156 of stiffening members 142 and 158 include a repeating pattern. More particularly, first and second patterns 140 and 156 include a sinusoidal pattern. Moreover, first and second patterns 140 and 156 can include a corrugated pattern. Alternatively, first and second patterns 140 and 156 can include non-repeating patterns. First and second patterns 140 and 156 can include any pattern that enables torque assembly 68 to function as described herein.

In the exemplary embodiment, each stiffening member 142 and 158 includes a first side 160, a second side 162, and a third side 164 coupling together first and second sides 160 and 162 forming a substantially rectangular shape. Moreover, adjacent stiffening members are separated by a space 163. First stiffening members 142 have a substantially same size and shape as second stiffening members 158. In an embodiment, stiffening members 142 and 158 can include rounded corners. Alternatively, stiffening members 142 and 158 can include any shape that enables torque assembly 68 to function as described herein.

Thermal barrier 126 is coupled to first torque tube 122 and to second torque tube 124. Thermal barrier 126 is configured to facilitate thermal isolating stator 26 from temperatures between thermal shield 72 and vacuum chamber 70. More particularly, thermal barrier 126 includes a first thermal portion 166 coupled to second end 130 and to thermal shield 72. Moreover, thermal barrier 126 includes a second thermal portion 168 coupled to thermal shield 72 and to support 152. Thermal barrier 126 includes an insulating material such as, for example, a polyimide or other low conductivity material. Alternatively, thermal barrier 126 is configured to separate the torque tube flanges through bushings (not shown) coaxially located with bolts to facilitate creating physical empty space between the flanges, and limiting thermal energy transfer at the bushing location. Moreover, bushings may include low conductivity materials. The size and shape of first and second patterns 140 and 156 of stiffening members 142 and 158 are configured to receive and transfer torque loads from stator 24 imposed on rotor 26 while reducing material requirements. First and second patterns 140 and 156 are configured to minimize and/or eliminate buckling of rotor 26 while reducing cooling requirements for rotor 26. More particularly, first and second patterns 140 and 156 are configured to increase the stiffness of torque tubes 122 and 124 while maintaining a thermal path to thermally isolate rotor 26. Moreover, first and second patterns 140 and 156 are configured to decrease the wall thickness and reduce the lengths of first and second torque tubes 122 and 124 to facilitate increasing the stiffness of first and second torque tubes 122 and 124.

Figure 11:
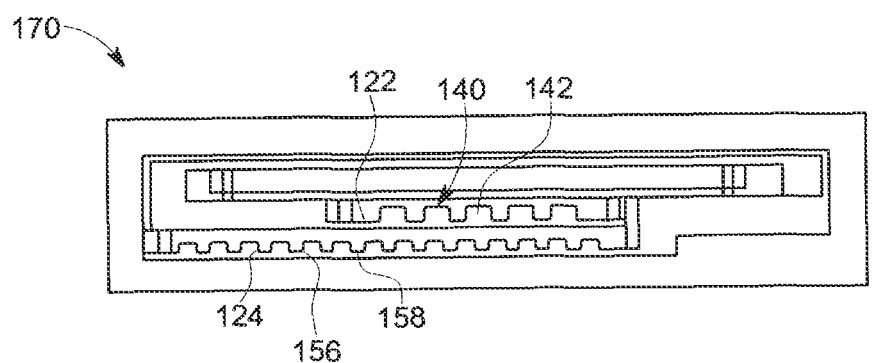
FIG. 11 is a cross sectional view of another exemplary torque assembly of the cooling assembly shown in FIG. 2.

FIG. 11 is a cross sectional view of another exemplary torque assembly 170 of cooling assembly 66. Torque assembly 170 includes first torque tube 122 having a first pattern 140 of the plurality of first stiffening members 142. Moreover, torque assembly 170 includes second torque tube 124 having a second pattern 156 of the plurality of second stiffening members 158. In the exemplary embodiment, second stiffening members 158 have a different size than first stiffening members 142. More particularly, first stiffening members 142 have a larger size than second stiffening members 158. Alternatively, second stiffening members 158 can have a larger size than first stiffening members 142. First and second stiffening members 142, 158 can include any size that enables torque assembly 68 to function as described herein.

Figure 12:
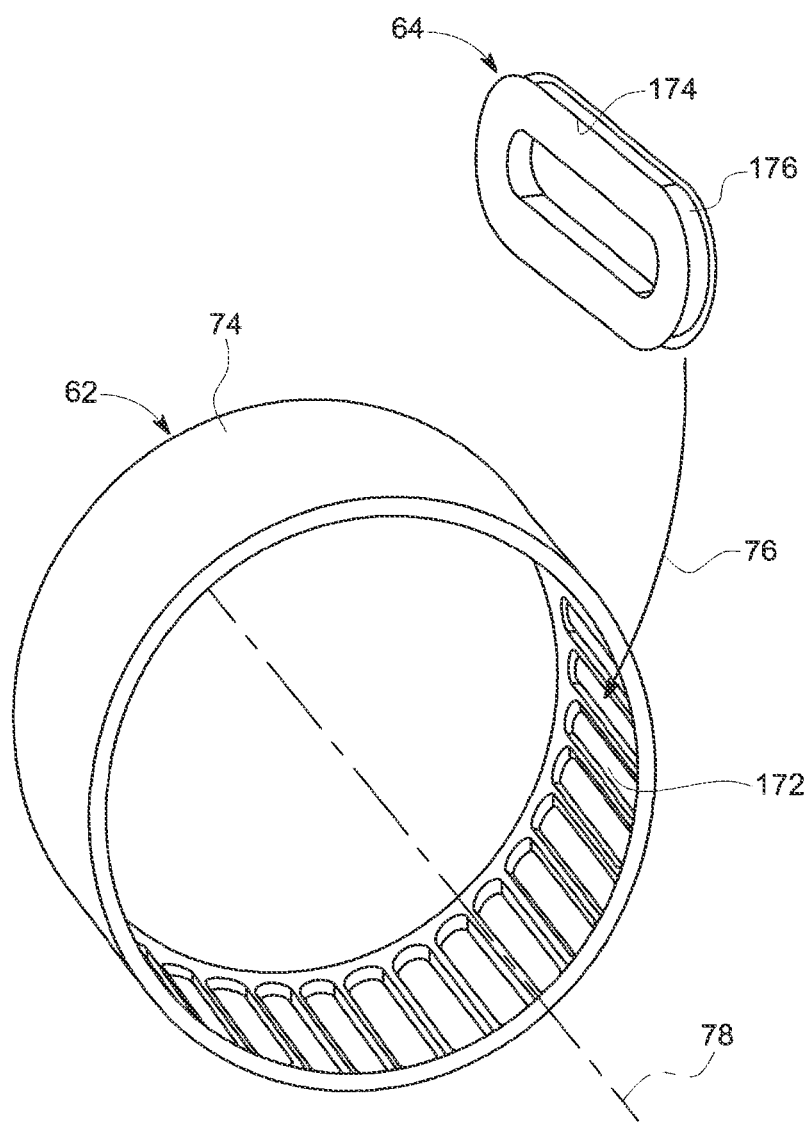
FIG. 12 is a perspective view of an exemplary coil former and coil winding of the cooling assembly shown in FIG. 2.

FIG. 12 is a perspective view of coil former 62 and coil winding 64 of cooling assembly 66. Second side 76 is orientated toward axis of rotation 78 and includes a recess 172 that is sized and shaped to receive coil winding 64. Since second side 76 is orientated toward axis of rotation 78, a machining process (not shown) such as, for example, a reaming process can conveniently form recess 172 on the large, internal circumferential surface of second side 76. In the exemplary embodiment, recess 172 is slightly oval shaped known as a racetrack configuration. Alternatively, recess 172 can include any shape to accept coil winding 64. Coil winding 64 includes a winding block 174 and conducting coils 176. More particularly, conducting coils 176 include strip-shaped, tape type or round or rectangular or twisted braids of conductors of low temperature and/or high temperature superconducting materials which are coupled radially inward within winding block 174.

Figure 13:
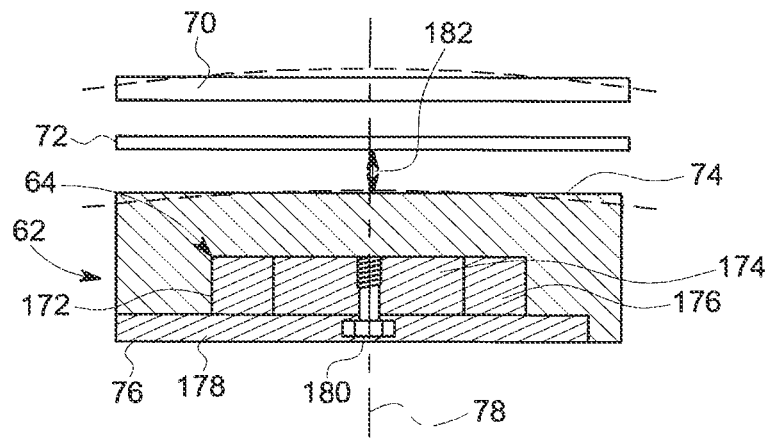
FIG. 13 is a cross sectional view of the coil former and coil winding shown in FIG. 12.

FIG. 13 is a cross sectional view of the coil former 62 and coil winding 64. Coil former 62 also includes a lid 178 coupled to at least one of second side 76 and winding block 174 by a fastener 180 such as, for example, a bolt. Since coil winding 64 is configured to insert within recess 172, which is orientated toward axis of rotation 78, fastener 180 prevents coil winding 64 from falling out from recess 172 under the force of gravity. More particularly, lid 178 and/or fastener 80 are sized and shaped to support the weight of coil windings 64 as opposed to withstanding radial loads to maintain cold windings 64 coupled to coil former 62 as compared to conventional coil formers (not shown). Since coil winding 64 is configured to insert within recess 172, second side 76 is configured to withstand radial loads during operations. Lid 178 and fastener 180 are configured for thermal considerations which reduces the size and cost of lid 178 and fastener 181. Alternatively, lid 178 and/or fastener 180 can be sized and shaped to withstand radial loads.

Since lid 178 is coupled to second side 76, lid 178 is configured to not interfere and/or contact thermal shield 72. Further, gap 182 between coil former first side 74 and thermal shield 72 is reduced which facilitates reducing the size of cooling assembly 66 and heat loads. Moreover, assembly of rotor 26 is more efficient since clearance between first side 74 and thermal shield 72 is better controlled without lid 178 coupled to first side 74 as compared to conventional coil formers (not shown).

Figure 14:
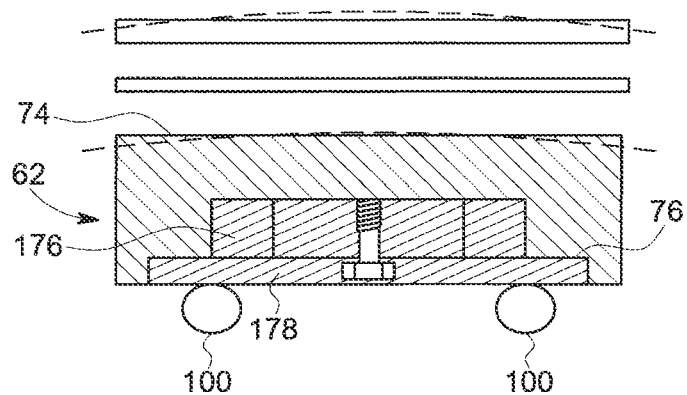
FIG. 14 is a cross sectional view of the coil former shown in FIG. 12 coupled to the cooling assembly shown in FIG. 4.

FIG. 14 is a cross sectional view of the coil former 62 coupled to flow assembly 88. More particularly, flow members 100 are coupled to lid 178. In an embodiment (not shown), flow members 100 can be embedded within lid 178 or can be coupled to second side 76. Since lid 178 is coupled to second side 76, the thermal path between conducting coils 176 and flow members 100 is reduced which facilitates increasing the efficiency of heat transfer from conducting coils 176 by reducing the thermal gradient from first side 74 to second side 76.

In the exemplary embodiment, a controller (not shown) can communicatively couple to cooling assembly 66 to control cooling of rotor 26. Due to remote location of many wind turbines 10 and difficult access to superconducting generator 16 located within nacelle 18, controller is configured to control cooling assembly during the cooling process using cryocoolers, flow assembly and torque assembly. In the exemplary embodiment, a remote operator (not shown) sends a signal (not shown) by any known means to controller to actuate cooling assembly to selectively cool rotor 26.

Figure 15:
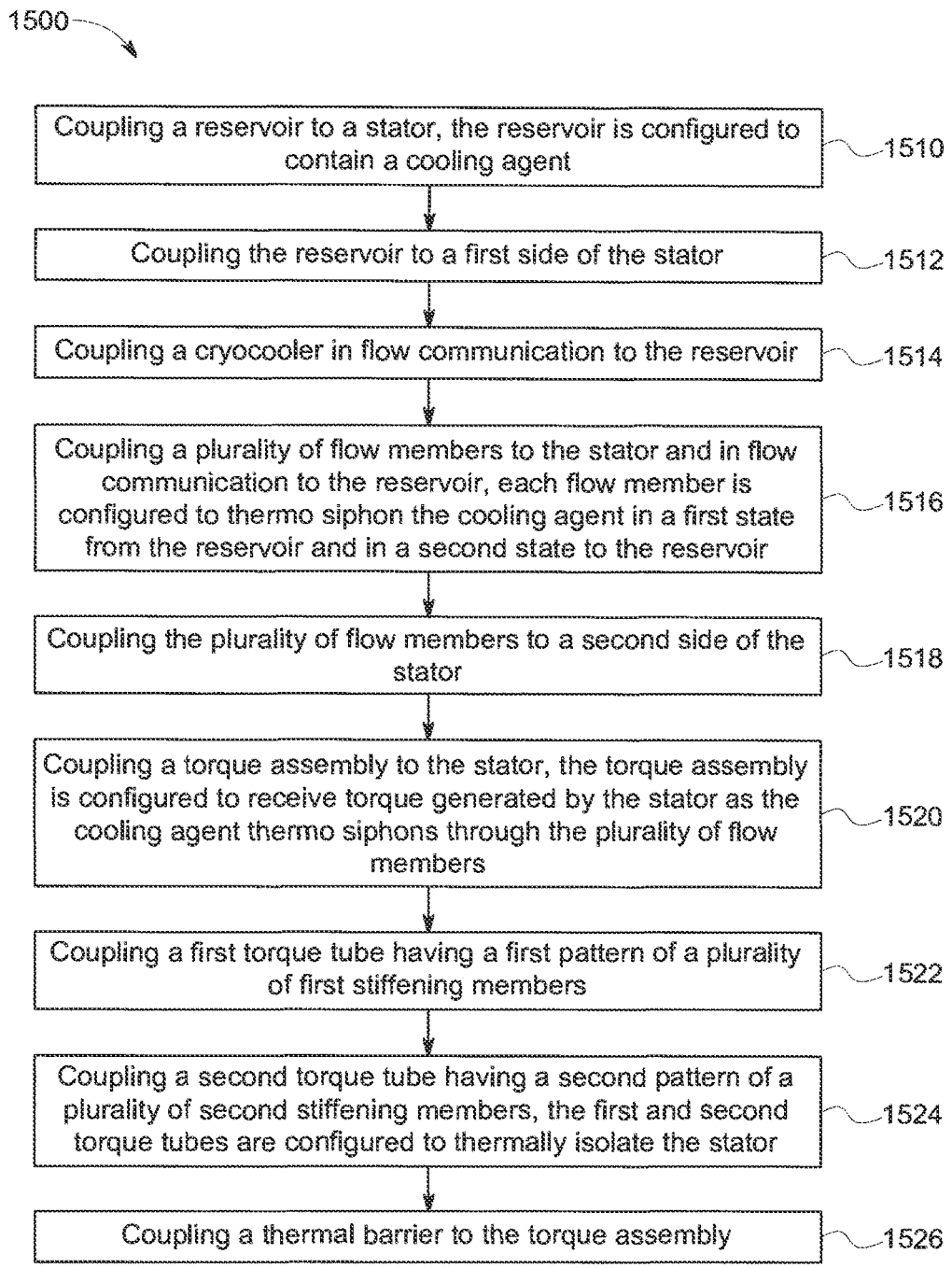
FIG. 15 illustrates an exemplary flowchart illustrating a method of assembling a cooling assembly for an electrical machine.

FIG. 15 illustrates and exemplary flowchart illustrating a method 1500 of assembling a cooling assembly, for example cooling assembly 66 (shown in FIG. 4). Method 150 includes coupling 1510 a reservoir, for example reservoir 90 (shown in FIG. 4) to a rotor, such as rotor 26 (shown in FIG. 4). The reservoir is configured to contain a cooling agent, for example cooling agent 80 (shown in FIG. 4). In the exemplary method 1500, coupling the reservoir to the rotor includes coupling 1512 the reservoir to a first side, such as first side 74 (shown in FIG. 4), of the rotor. A cryocooler, for example cryocooler 84 (shown in FIG. 4), is coupled 1514 in flow communication to the reservoir.

Method 1500 includes coupling 1516 a plurality of flow members, for example flow members 100 (shown in FIG. 4), to the stator and in flow communication to the reservoir. Each flow member is configured to thermosiphon the cooling agent in a first state, such as first state 108 (shown in FIG. 5), from the reservoir and in a second state, such as second state 112 (shown in FIG. 5), to the reservoir. In the exemplary method 1500, coupling 1516 the plurality of flow members includes coupling 1518 the plurality of flow members to a second side, for example second side 76 (shown in FIG. 4), of the stator.

Moreover, method 1500 includes coupling 1520 a torque assembly, such as torque assembly 68 (shown in FIG. 10), to the rotor. The torque assembly is configured to receive torque generated by the stator and experienced by the rotor as the cooling agent thermosiphons through the plurality of flow members. In the exemplary method 1500, coupling 1520 the torque assembly includes coupling 1522 a first torque tube, for example first torque tube 122 (shown in FIG. 10), having a first pattern, for example first pattern 140 (shown in FIG. 10), of a plurality of first stiffening members, such as first stiffening members 142 (shown in FIG. 10). Moreover, coupling 1520 the torque assembly includes coupling 1524 a second torque tube, for example second torque tube 124 (shown in FIG. 10), having a second pattern, such as second pattern 156 (shown in FIG. 10), of a plurality of second stiffening members, for example second stiffening members 158 (shown in FIG. 10). The first and second torque tubes are configured to thermally isolate the rotor and to transfer torque generated by the stator and imposed on the rotor. Method 1500 further includes coupling 1526 a thermal barrier, such as thermal barrier 126 (shown in FIG. 10), to the torque assembly.

The embodiments described herein relate to thermosiphoning to facilitate uniform cooling of heat generating components such as rotating or non-rotating rotors or superconducting stators. The cooling assembly is configured to uniformly cool and maintain temperature profiles around and within rotor; reduce cooling power electronically according to wind loads; to enable remote control of cryocooler and to remotely monitor system health through thermal response feedback.

The embodiments described herein relate to a thermal budget for a variety of cryocoolers, for example, 4 K GM cryocooler and 4 K PTR cryocoolers or other type of coolers. The cooling assembly includes a compact arrangement of cooling flow members to increase heat transfer from rotor while reducing the size of cooling assembly. Furthermore, cooling assembly is arranged close to the torque assembly to reduce at least the size of the vacuum chamber. More particularly, cooling assembly includes one or more reservoirs positioned within the air gap between the rotor and the stator and includes flow members coupled to an inner side of coil former. The size and shape of cooling assembly reduces the required volume of cooling agent such as helium depending on the power rating of the superconducting generator and required cooling. Moreover, the reservoir is sized and positioned to allow for convenient time for cold head exchange during maintenance or replacement operations. The cooling assembly can include other means of heat transfer such as, for example, heat pipes.

The embodiments described herein include flow members which are configured to overcome tube friction, reduce and/or eliminate vapor locking or flow choking while maintaining thermosiphoning flow of cooling agent during different operating conditions. Moreover, the embodiments described herein relate to a torque assembly that is configured to satisfy stiffness and thermal loading requirements for the rotor while providing a cost-effective solution to support the rotor. The embodiments described herein relate to a coil former that requires less space while bearing a higher radial load capacity; eases manufacturing of field winding assembly and enhances thermal system cooling. Moreover, the embodiments described facilitate uniform stress distribution within the coil former.

A technical effect of the systems and methods described herein includes at least one of: a method of cooling an electrical machine by thermosiphoning a cooling agent; supporting a rotor, thermally isolating the rotor and transferring torque from the stator and experienced by the rotor and/or transmitted by the rotor.

Exemplary embodiments of an electrical machine and methods for assembling the electrical machine are described above in detail. The size ranges disclosed herein include all the sub-ranges there between. The methods and systems are not limited to the specific embodiments described herein, but rather, components of systems and/or steps of the methods may be utilized independently and separately from other components and/or steps described herein. For example, the methods may also be used in combination with other manufacturing systems and methods, and are not limited to practice with only the systems and methods as described herein. Rather, the exemplary embodiment can be implemented and utilized in connection with many other electrical component applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A cryocooler assembly for cooling a field winding assembly of an electrical machine having an axis of rotation, said assembly comprising:
   a cryocooler;
   a reservoir coupled in flow communication to said cryocooler and configured to contain a cooling agent;
   a flow assembly coupled in flow communication to said reservoir, said flow assembly comprising:
   a first flow loop coupled in flow communication to said reservoir;
   a second flow loop coupled in flow communication to said reservoir; and
   a plurality of flow members coupled in flow communication to said first flow loop and said second flow loop and coupled to the field winding assembly, each flow member is configured to thermosiphon the cooling agent in a first state from said reservoir and in a second state to said reservoir, wherein each flow member is further configured to channel the cooling agent from the first flow loop to the second flow loop; and
   a torque assembly coupled to the field winding assembly, and configured to receive torque experienced by the field winding assembly as the cooling agent thermosiphons through said plurality of flow members;
   wherein the cryocooler comprises a first cryocooler coupled in flow communication to said first flow loop and a second cryocooler coupled in flow communication to said second flow loop.

2. The assembly of claim 1, wherein said plurality of flow members are configured in at least one of a herringbone arrangement, a helical arrangement between said first flow loop and said second flow loop.

3. The assembly of claim 1, wherein each flow member comprises a first portion and a second portion which are coupled in flow communication to each other at an angle.

4. The assembly of claim 1, wherein each flow member comprises a first portion and a second portion which are angled at least 5° as measured from the axis of rotation.

5. The assembly of claim 1, wherein each flow member comprises a first portion and a second portion which are angled from 5° to 45° as measured from the axis of rotation.

6. The assembly of claim 1, wherein the reservoir has a volume from 5 liters to 30 liters.

7. A superconducting generator having an axis of rotation, said generator comprising:
   a housing;
   a rotating stator;
   a rotor coupled to said housing coaxial to said rotating stator and separated from said rotating stator by a gap, said rotor comprising:
   a coil former having a first side and a second side, said first side is orientated toward said rotating stator and said second side is orientated toward the axis of rotation and comprises a recess;
   a coil winding positioned within said recess and coupled to said second side;
   a cryocooler assembly coupled to said coil former and configured to cool said rotor, said cryocooler assembly comprising:
   a cryocooler;
   a reservoir coupled in flow communication to said cryocooler and configured to contain a cooling agent;
   a flow assembly coupled in flow communication to said reservoir, said flow assembly comprising:
   a first flow loop coupled in flow communication to said reservoir;
   a second flow loop coupled in flow communication to said reservoir; and
   a plurality of flow members coupled in flow communication to said first flow loop and said second flow loop and coupled to the coil winding assembly, each flow member is configured to thermosiphon the cooling agent in a first state from said reservoir and in a second state to said reservoir, wherein each flow member is further configured to channel the cooling agent from the first flow loop to the second flow loop.

8. The generator of claim 7, wherein the recess is an oval shaped recess.

* * * * *